Jan. 29, 1946.  C. HERFURTH  2,393,907
MILLING MACHINE VIBRATION DAMPENER
Filed Jan. 17, 1944  2 Sheets-Sheet 1
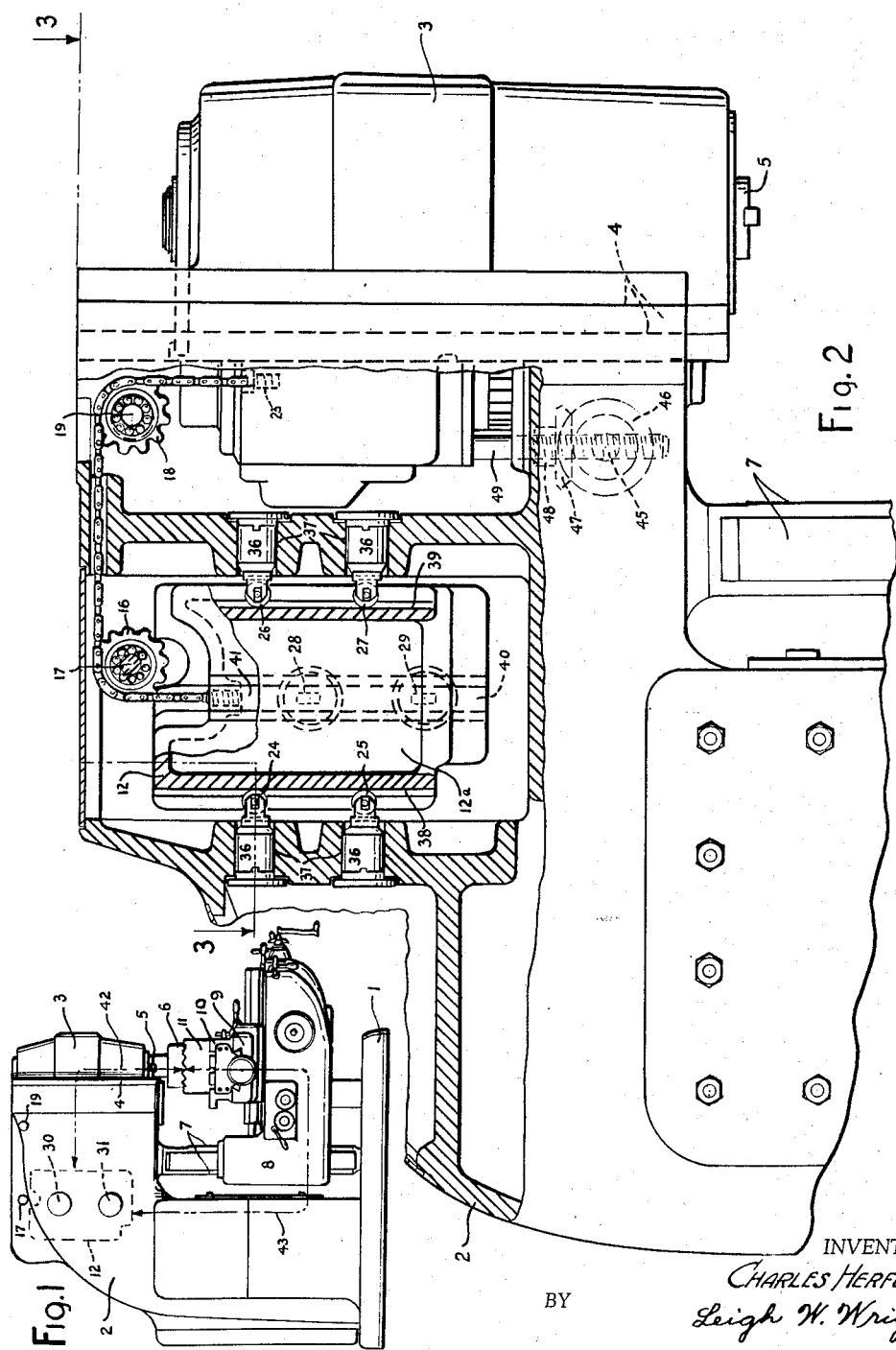
INVENTOR.
CHARLES HERFURTH
BY Leigh W. Wright
ATTORNEY.

Jan. 29, 1946.  C. HERFURTH  2,393,907
MILLING MACHINE VIBRATION DAMPENER
Filed Jan. 17, 1944  2 Sheets-Sheet 2

INVENTOR.
CHARLES HERFURTH
BY
Leigh W. Wright
ATTORNEY.

Patented Jan. 29, 1946

2,393,907

UNITED STATES PATENT OFFICE 2,393,907

MILLING MACHINE VIBRATION DAMPENER

Charles Herfurth, Cincinnati, Ohio, assignor to The Cincinnati Milling Machine Co., Cincinnati, Ohio, a corporation of Ohio Application January 17, 1944, Serial No. 518,641

5 Claims. (Cl. 90—16)

This invention pertains to milling machines and more particularly to improvements in mechanism for minimizing vibration or chatter therein.

In machine tools in which a relative movement of the work and tool is provided for purposes of effecting a machining operation, vibration and chatter frequently are present due to the interaction of the cutter and work piece. Such vibration and chatter particularly develops in a machine tool such as a milling machine in which there is intermittent cutting action between cutter and work due to the successive presentation of the cutting edges of the milling cutter to the work piece during the machining operation, resulting in inaccuracy and chatter marks in the finished work surface and damage to the cutter and the power transmission of the machine if allowed to continue uncontrolled.

It is, therefore, one of the objects of this invention to provide an improved mechanism for damping or absorbing vibration and chatter initiated by the cutting action of the cutter and work in a milling machine.

Another object is to provide vibration damping mechanism in a machine tool structure which is located intermediate the tool and work carrying portions of the machine tool.

Still another object is to provide a combined vibration dampener and counterweight for a milling machine.

And another object is to provide mechanism which is universally effective to absorb and minimize vibration and chatter in a machine tool structure for any direction of relative movement of cutter and work.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which similar reference characters indicate like or similar parts:

Figure 1 is a left hand side elevational view of a knee and column type milling machine embodying this invention.

Figure 2 is a fragmentary enlarged left hand side view of the machine in Figure 1, partly in section on the line 2—2 of Figure 3.

Figure 3:
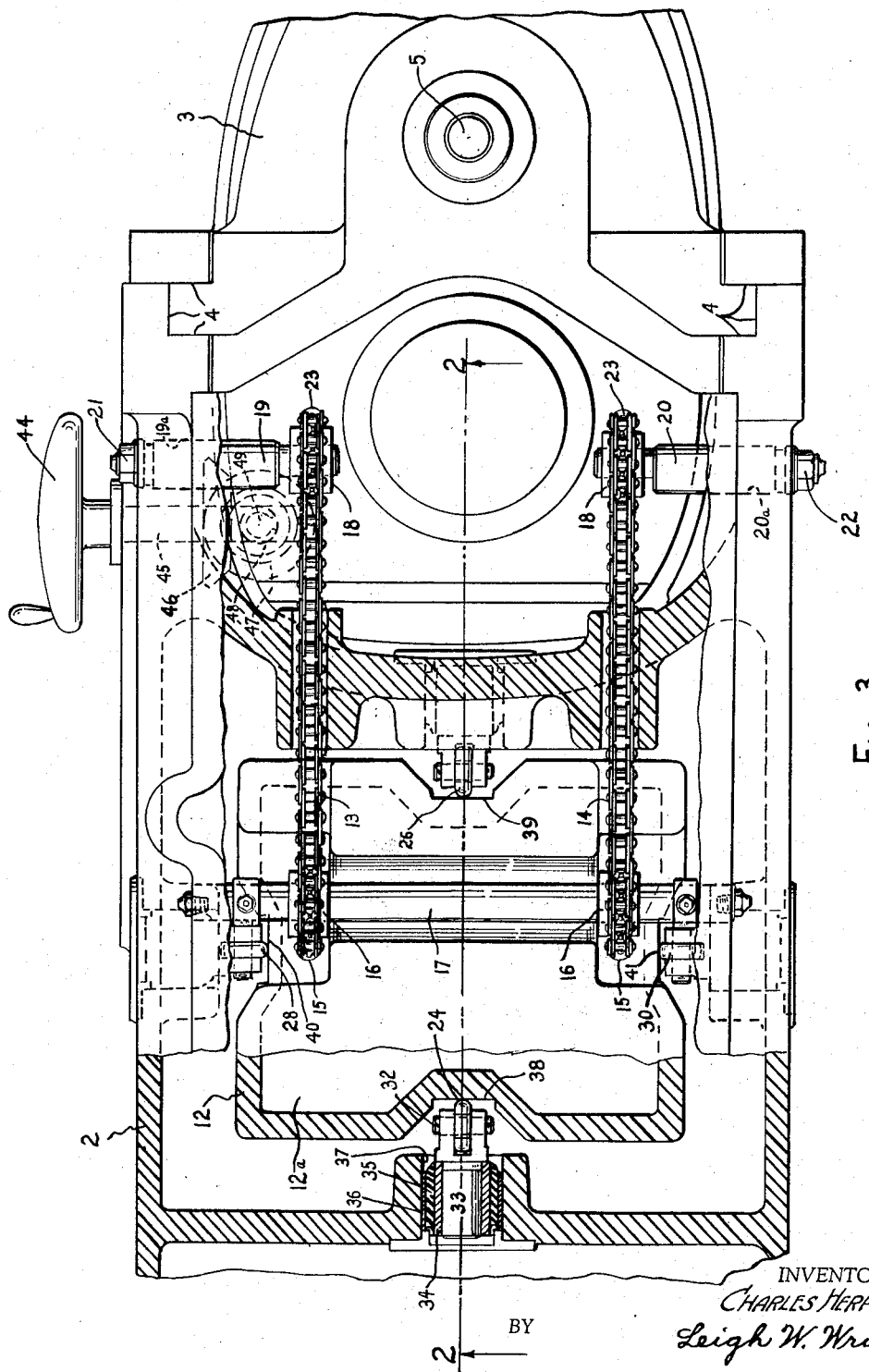
Figure 3 is a fragmentary enlarged plan view particularly in section on the line 3—3 of Figure 2.

As an exemplary embodiment of this invention in a machine tool there is shown a knee and column type milling machine, Figure 1, comprising a base 1 having an integral column portion 2 having a vertically slidable cutter spindle head 3 mounted thereon in suitable guideways 4 and carrying the rotatable cutter spindle 5 to which may be attached a milling cutter 6. Also mounted on the column 2 on suitable guideways 7 are the work carrying members comprising the knee 8 upon which is mounted the saddle 9 and the work table 10 carrying a work piece 11.

During the operation of such types of milling machines the milling cutter 6 is rotated at an appropriate cutting speed and a relative movement of the work 11 and cutter 6 is effected by actuating the various work carrying members 8, 9 or 10 in feeding movements. As a result of the cutter rotation and relative feeding movement of the work 11, an intermittent cutting action takes place between the work piece and the successive teeth of the cutter 6 as they are continuously presented to the work surface being machined. It has been found that due to the natural resilience of the machine structure, the interaction of the cutter and work piece during such cutting operations sets up vibration and chatter between work and cutter which is transmitted by the cutter to the spindle carrying portion of the machine structure and transmitted by the work to the work carrying members or portion of the machine structure. Because of the interconnection of the vibratory forces from the spindle and work carrying portions of the machine through the common column 2, such forces are mutually interrelated through the structure from the spindle or work carrying portions of the machine to cause harmonic vibrations to develop in the entire machine structure which further aggravate and prolong the relative vibration between cutter and work. It is, therefore, the purpose of this invention to provide an improved vibration dampening apparatus for a milling machine which may be resiliently interconnected at a strategic location within the machine structure to counteract and minimize the chatter and vibration and permit smooth and accurate finish to be obtained for the work surface being machined.

In the particular structure shown, the spindle head 3 sliding up and down in the ways 4 has its natural downward gravitational weight absorbed by means of a combined vibration dampener and counterweight 12 which is connected to a pair of suspension chains 13 and 14 by appropriate connecting screws 15. These chains pass over a pair of sprockets 16 journaled on a shaft 17 fixed in the column 2 of the machine. The suspension chains 13 and 14 extend horizontally toward the front of the machine where they pass over another pair of sprockets 18, each of which is respectively journaled on an adjustable eccentric stud 19 and 20 carried in the column 2 of the machine. These studs have flatted nut portions 21 and 22 formed integral therewith whereby they may be rotated to effect equal tension in the chains 13 and 14 for proper suspension of the vibration dampener and counterweight 12. Friction between the studs in the mounting bores 19a and 20a serves to hold them in adjusted position. The chains 13 and 14 extend over the sprockets 18 and downwardly therefrom and are connected rigidly to the spindle carrying head 3 by appropriate mounting screws 23.

The combined vibration dampener and counterweight 12 is made sufficiently heavy and massive by filling its interior cavity 12a with lead, sand, or other like vibration damping material so as to counterbalance the downward weight of the spindle head 3. In this way the spindle head 3 may be easily moved upwardly or downwardly with a minimum of effort while the counterweight 12, through the medium of the chains 13 and 14, is constantly pulling upwardly on the head 3 during the normal operation of the machine.

In order to damp out and minimize vibration which may develop in the column 2 and associated machine structure during interaction of the cutter 6 and work 11, the vibration dampener and counterweight 12 is resiliently interconnected with the column 2 through the medium of a plurality of opposed resilient contact and stabilizing means carried by the column and guidingly engaging the counterweight 12. This mechanism comprises a series of rollers 24 through 31 inclusive, each of which is mounted as shown particularly in Figure 3 in connection with roller 24. Each roller is carried on a pin 32 in the bifurcated end of a stud 33 rigidly fixed to a sleeve 34. The sleeve has vulcanized thereto a suitable resilient medium 35, such as rubber, and which, in turn, is also vulcanized to an outer sleeve 36 rigidly carried in appropriate bores 37 formed in the column 2 of the milling machine. Thus, there is provided a series of rollers 24 through 31 inclusive, which respectively resiliently contact finished guideways 38, 39, 40 and 41 formed on the sides of the vibration dampener and counterweight 12 permitting freedom of vertical movement of the counterweight between the rollers.

In this way as vibrating movement develops in the column 2, the vibration dampener and counterweight 12 will initially remain in a stationary position and through the guide rollers will exert a dampening force, tending to prevent the vibrating action in the column 2 and thus minimize vibration and chatter of cutter and work piece. It is to be noted that this vibration dampener and counterweight 12, Figure 1, is so positioned as to lie intermediate the spindle carrying housing 3 and the work carrying members, 8, 9 and 10 so that the chatter and vibrating forces transmitted along the line 42 to the column 2 by the cutter and the vibration and chatter transmitted by the work along the line 43 do not intercommunicate with each other in the column directly as the vibration dampener and counterweight 12 intercepts the interaction of these two sources of vibration and chatter 42 and 43. Thus, the vibration dampener and counterweight 12 serves to break up the continuous circuitous path of vibration development 42—43 which would otherwise develop if the vibration and chatter forces were allowed to be directly interconnected through the column 2 and thus cause a continuous increasing harmonic vibration between the cutter 6 and the work 11. By thus damping out vibration in the intermediate position of the column 2 as shown in Figure 1 this interaction of the vibration transmitted from the spindle supporting portion and the work supporting portion of the machine is prevented.

It is to be noted that this counterweight vibration damping mechanism is effective in all horizontal directions of possible vibratory movement of the column 2 so as to automatically take care of any direction of relative feeding of the work by the table 10 or by the saddle 9 or by a combination of both of these work carrying members operating simultaneously.

It will be further noted that because of the continual pulling action of the vibration dampener and counterweight 12 on the spindle housing 3 that vibration dampening is also effected in a vertical direction through the chains 13 and 14 to thereby take care of chatter and vibration set-up in a vertical direction in the cutter spindle which may be particularly present when vertically actuating the knee 8 up and down to effect relative cutting action between the work 11 and the cutter 6.

Any appropriate means may be utilized for raising and lowering the head 3 on the ways 4 such as a hand wheel 44 carried on a shaft 45 journaled in the column 2 and having on its inner end a bevel gear 46 which meshes with an appropriate bevel gear 47 formed on an elevating nut 48 journaled against axial movement in the column 2 of the machine. Operating in the nut 48 is a vertical elevating screw 49 rigidly attached to the spindle head 3 so that upon rotation of the hand wheel 44 and thus the nut 48 the head 3 may be moved up and down on the guideways 4. It will be further noted that during this vertical motion by the hand wheel 44, which is utilized during certain types of cutting operations in addition to its use for initially setting or adjusting the head, that the vibration dampening effect of the counterweight 12 operating through the chains 13 and 14 above set forth serves to effect vibration damping in a vertical direction in the head 3.

In this way has been provided a combined vibration dampener and counterweight which is located in the machine structure intermediate the cutter spindle carrying portion and the work carrying members so as to prevent intercommunication of vibration and chatter between these portions through the machine column during the interaction of cutter and work. Also, it is to be noted that this combined vibration dampener and counterweight serves to assist in the manipulation of certain of the movable machine members and is universally effective in its vibration damping action to eliminate vibration and chatter for any relative direction of movement of cutter and work.

What is claimed is:

1. In a milling machine, a column, a tool carrying member mounted on said column, a work carrying member mounted on said column, a combined vibration dampener and counterweight located in said column intermediate said tool and work carrying members, resilient interconnecting means effective in a horizontal plane at said intermediate location to restrict relative movement of said column and said combined vibration dampener and counterweight, and means for suspending said combined vibration dampener and counterweight from said tool carrying member so as to facilitate the movement of said tool carrying member while effecting vibration damping action therein.

2. In a milling machine having a column, a spindle carrier vertically reciprocable on said column, a rotary cutter spindle journaled in said carrier having a cutter mounted thereon, a work holding member mounted on said column and movable relative to said cutter spindle for supporting a work piece, a combined vibration dampener and counterweight associated with said column and spindle carrier comprising a counterweight, means for suspending said counterweight in said column from said spindle carrier to counteract downward gravitational movement of said spindle carrier on said column, resilient guiding means carried in said column engaging said counterweight to restrict relative movement of said counterweight and said column to effect a vibration damping action in said column to minimize vibration and chatter in the machine structure due to the interaction of said cutter and said work piece.

3. In a milling machine structure having a vertically movable cutter spindle carrier and a work carrying member in said structure movable relative to a work spindle in said carrier, a combined vibration dampener and counterweight located in said structure between said spindle carrier and said work carrying member, means for suspending said combined vibration dampener and counterweight in said machine structure by interconnecting it with said spindle carrier to facilitate the relative vertical movement of said carrier, resilient guiding means permitting vertical relative movement of said combined vibration dampener and counterweight in accordance with the movements of said spindle carrier, said resilient guiding means intercommunicating vibrational forces in said machine structure to said vibration dampener and counterweight to effect a vibration damping action on the machine structure during the cutting action effected by the relative movement of said cutter spindle and said work carrying member.

4. In a milling machine, a base, a column, a cutter spindle carrier vertically reciprocable on said column, a rotary cutter spindle journaled in said spindle carrier, a knee, saddle, and table movable on said column, a counterweight carried in said column and connected to said spindle carrier by suspension chain means to counterbalance the downward weight of said spindle carrier, means for reciprocating said spindle carrier in vertical movements, and means for restricting horizontal vibratory movements of said column relative to said counterweight to effect a vibration damping action in said column, comprising a plurality of vertically disposed guideways formed on said counterweight and a series of cooperating resiliently mounted guide rollers carried in said column engaging each of said guideways to restrict horizontal movements of said counterweight relative to said column while permitting freedom of vertical reciprocating movement in said counterweight upon movement of said spindle carrier.

5. In a milling machine having a base and a column, a cutter spindle carrier vertically reciprocable on said column, a rotary cutter spindle journaled in said spindle carrier, a knee, saddle, and table movable on said column, a counterweight associated with said column and suspended from said spindle carrier by suspension chain means to counterbalance the downward weight of said spindle carrier and minimize vibration in said spindle carrier during vertical feeding movement thereof, means for reciprocating said spindle carrier in vertical movements, and means for restricting relative horizontal movements of said column and counterweight to effect a vibration damping action in said column, comprising a plurality of vertically disposed guideways formed on said counterweight, a series of cooperating guide rollers resiliently mounted in said column and engaging said guideways to restrain horizontal movement of said counterweight relative to said column while permitting vertical reciprocating movement of said counterweight relative to said column upon movement of said spindle carrier.

CHARLES HERFURTH.